United States Patent [19]
Hendry

[11] Patent Number: 5,114,660
[45] Date of Patent: * May 19, 1992

[54] METHOD OF INJECTING MOLDING

[75] Inventor: James W. Hendry, Brooksville, Fla.

[73] Assignee: Milad Limited Partnership, Naples, Fla.

[*] Notice: The portion of the term of this patent subsequent to Jul. 16, 2008 has been disclaimed.

[21] Appl. No.: 552,909

[22] Filed: Jul. 16, 1990

[51] Int. Cl.$^5$ .................. B29C 45/00; B29D 22/00
[52] U.S. Cl. .................. 264/572; 264/328.8; 264/328.12; 264/328.13
[58] Field of Search .................. 264/85, 328.8, 328.12, 264/500, 572, 328.13; 425/812

[56] References Cited

U.S. PATENT DOCUMENTS

| 4,101,617 | 7/1978 | Friederich | 264/572 |
| 4,855,094 | 8/1989 | Hendry | 264/40.3 |
| 4,935,191 | 6/1990 | Baxi | 264/572 |
| 4,948,547 | 8/1990 | Hendry | 264/500 |
| 5,039,463 | 8/1991 | Loren | 264/40.3 |

Primary Examiner—Leo B. Tentoni
Attorney, Agent, or Firm—Brooks & Kushman

[57] ABSTRACT

A method and system for the injection molding of plastic articles in an injection molding system including a pneumatically operated gas compression unit having a high pressure gas receiver. The injection molding system includes a resin injection nozzle and a mold having an injection aperture and mold cavity for receiving molten resin from the nozzle. The gas compression unit includes a gas booster which pressurizes a first charge of gas to the pressure setting of a pressure switch. The gas receiver stores the first charge of pressurized gas at a pressure level within a predetermined range of pressures. At least one fluid pressure reducing valve reduces the pressure of the gas as it is communicated from the fluid receiver to an orifice in the mold to an acceptable level for molding the article. The gas compression unit is capable of servicing a plurality of injection molding machines and corresponding molds when a like plurality of pressure reducing valves are provided.

5 Claims, 2 Drawing Sheets

METHOD OF INJECTING MOLDING

TECHNICAL FIELD

This application relates to method and systems for injection molding of plastic articles using fluid pressure and, in particular, to method and systems for the injection molding of plastic articles using fluid pressure to assist in the making of plastic articles.

BACKGROUND ART

It is known in the plastic molding art to use pressurized fluid in conjunction with the plastic molding of articles, as disclosed in the Friederich U.S. Pat. No. 4,101,617.

Gas-assisted injection molding is a thermoplastic molding process which provides stress-free large parts with a class A surface and virtually no sink marks. Gas-assisted injection molding is a low-pressure molding process compared to conventional injection molding. In this process, inert gas is injected into the plastic after it enters the mold. The gas does not mix with the plastic but remains in the middle of the thicker sections of the molding. By controlling the gas pressure, the quantity of plastic injected into the mold (short shot) and the rate of gas flow, a predetermined network of hollow interconnecting channels is formed within the molded part. The gas pressure remains constant in the network of hollow channels throughout the molding. This compensates for the tendency of the plastic to shrink at the thicker areas of the molding, preventing warpage and reducing stress. The gas pressure is relieved just prior to opening the mold. Because of the relatively low injection pressure, large parts can be molded with substantial reductions in clamp tonnage.

The gas system equipment provides the precise control of pressure, timing and volume of gas which is injected into the part, all of which are important to the control of the gas-assisted injection process.

In U.S. Pat. No. 4,948,547 entitled "Improved Method for the Use of Gas Assistance in the Molding of Thermoplastic Articles," assigned to the Assignee of the present invention, a method of gas-assisted injection molding is disclosed in which a charge of pressurized gas is injected into the mold but not into the article-defining cavity. The gas charge is of a predetermined quantity and pressure, sufficient to assist in filling out the article defining cavity with resin and promoting surface quality.

FIG. 2 is a general schematic view of a prior art apparatus suited for practicing plastic injection molding, generally of the type of which the present invention is directed.

The controlled entry of pressurized fluid, typically nitrogen gas, is accomplished by the use of a modified mold sprue 10. The sprue 10 includes a disc-shaped insert 12 disposed within a sprue body 14.

The mold sprue 10 cooperates with a conventional plastic injection molding machine 20, the nozzle 18 of the molding machine 20 mates with a concave surface 22 on the face of the insert to provide a continuous path 16 for the flow of plastic from the machine 20 through the sprue 10 and into a mold cavity (not shown).

The flow of molten plastic through the insert 10 may be diverted by a conventional torpedo 4 of the type well known in the art.

The introduction of pressurized fluid to the flow path is through passage segments 26 and 28 formed (by drilling or the like) in the insert. The passage 26 opens into the flow path through an orifice 30 of sufficiently small dimension, for example, 0.005 to 0.040 inches, depending on the viscosity of the plastic to actively prevent entry of the relatively high viscous molten plastic during injection.

The plastic injection molding machine 20 includes a barrel 32 with a central cylindrical opening 34. A screw 36 serves to plasticize and advance resin toward the nozzle area. Upon complete plasticization of the resin, the screw 36 is hydraulically advanced toward the head of the barrel 32 to inject molten plastic through the nozzle 18. The plastic passes through the sprue insert 12 at a nominal plastic injection pressure through the stroke of the screw 36. This pressure falls upon substantial completion of the stroke and discharge of the plastic from the barrel 32 of the molding machine 20.

The insert 12 is shown mounted concentrically in a recess in the sprue body 14. Molten plastic passes from the nozzle 18 and around the torpedo through a pair of kidney-shaped apertures (not shown) which serves as first and second branches in the flow path. The pressurized fluid is communicated to the plastic flow path through passage segment 26 and orifice 30 which is mediate the plastic flow branches and colinear therewith.

The temperature of the insert 12 can be controlled, depending on the processing specification of the plastic being used by employing electrical heater bands or other types of auxiliary heat sources, as is well known in the art.

The apparatus of FIG. 2 also includes a mechanism 37 for charging and communicating the pressurized fluid or gas to the sprue insert 12. For example, a hydraulic fluid supply 38 directs a working fluid, such as oil under pressure to a chamber 40 of an accumulator 42 effectively separated into two chambers, having mutually and inversely variable volumes by a compression piston 44. A fluid supply 46 is provided for directing a charge of gas through a first check valve 48 into the second chamber 50 of the accumulator 42 for pressurization. A control valve 54 controls communication of the gas from the chamber 50 to the sprue insert 12. A check valve 52 is connected in series with the control valve 54.

The mechanism for charging a pressurized fluid or gas for use in the prior art molding process is described in greater detail in U.S. Pat. No. 4,855,094. Also, a detailed description of the operation of the mechanism 37 is described in this patent which is assigned to the Assignee of the present application.

One limitation of the prior art mechanism 37 is that the hydraulic unit can only recharge after the plastic injection molding cycle is substantially completed (typically 75%). Also, such a hydraulic unit must be recharged after each cycle. Consequently, a relatively constant pressure is not always available with such a hydraulic unit which uses a multiplier system.

Another drawback of such a hydraulic unit is that it is not flexible to adapt to more than one concurrently operating molding process. Consequently, a separate hydraulic unit must be provided for each injection molding machine and mold combination.

DISCLOSURE OF THE INVENTION

An object of the present invention is to provide a method and system for the injection molding of plastic articles wherein charges of fluid can be pressurized at any time during an injection molding process.

Another object of the present invention is provide a method and system for the injection molding of plastic articles wherein it is not required that fluid charge means for pressurizing charges of fluid need be recharged for each injection molding cycle.

Yet still another object of the present invention is to provide a method and system for the injection molding of plastic articles wherein a fluid, having a relatively constant pressure, is always available during the injection molding process.

Yet still further another object of the present invention is to provide a method and system for the injection molding of plastic articles wherein a fluid charge means and fluid receiver means are adapted to run more than one injection molding system with a minimum amount of adaptation.

In carrying out the above objects and other objects of the present invention, a method for the injection molding of plastic articles in an injection molding system is provided. The injection molding system includes a resin injection nozzle and a mold having an injection aperture and a mold cavity for receiving molten resin from the nozzle. The method includes the steps of pressurizing a charge of fluid, storing the charge of pressurized fluid within a fluid receiver means at a level within a predetermined range of pressures and injecting a quantity of molten plastic from the injection nozzle through the injection aperture and into the mold cavity. The method further includes the steps of communicating the pressurized fluid from the fluid receiver means to an orifice in communication with the mold cavity simultaneously with or after the step of injecting. Also, the fluid is contained under pressure within the mold until the article has set up from the mold cavity, after which the fluid is vented to the mold. Finally, the steps of injecting, communicating, containing and venting are repeated until the pressure within the fluid receiver means is below the range of pressures at which time the steps of pressurizing and storing are repeated in preparation for molding another article.

Further in carrying out the above objects and other objects of the present invention, a system is provided for carrying out each of the above-noted method steps.

Preferably, the method also includes the step of reducing the pressure of the fluid from the fluid receiver means to an acceptable level for molding of articles during the step of communicating. This method step is typically performed by a fluid pressure reducing mechanism, such as a pressure reducing valve. A plurality of such pressure reducing valves may be provided in order that the charging and communicating system is capable of running of plurality of injection molding machines and their associated molds.

The objects, features and advantages of the present invention are readily apparent from the following detailed description of the best mode for carrying out the invention when taken in connection with the accompanying drawings.

BEST MODE FOR CARRYING OUT THE INVENTION

The present invention will be first described by reference to the operational steps of the method. Then, the system employed in the preferred embodiment will be described.

General Method of Operation

Figure 1:
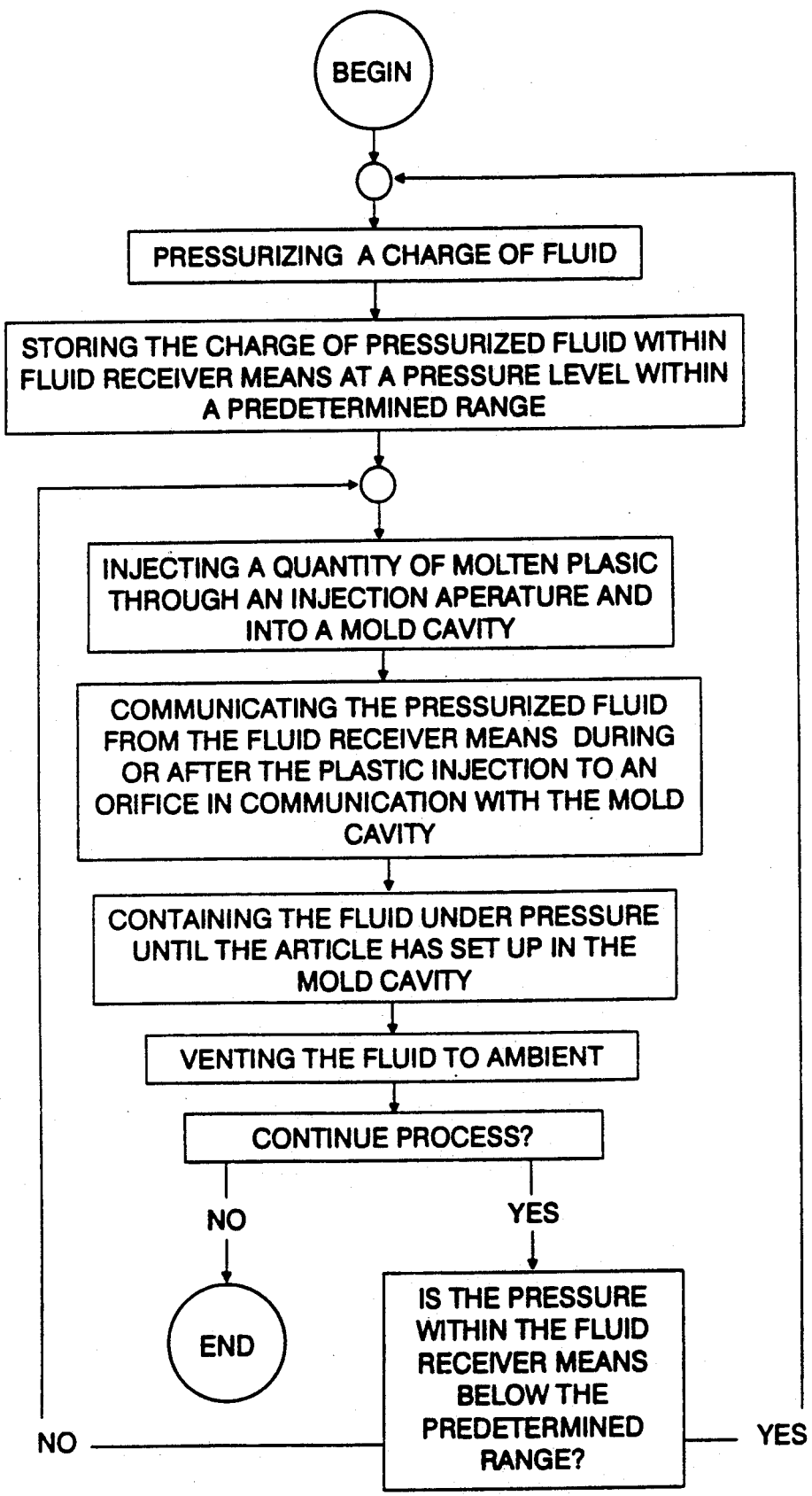
FIG. 1 is a flowchart setting forth the operational steps of the method of the present invention.

FIG. 1 is a flowchart setting forth the general operational steps involved in the method of the present invention. In overview, the method provides for molding of plastic articles with hollow interior sections where pressurized fluid is present in formation of the article in the mold cavity. The presence of the pressurized fluid creates an outward pressure which minimizes sink marks and reduces the material requirements and weight of the molded article. However, it is to be understood that the method is capable of providing for the molding of plastic articles with solid interior where pressurized fluid is injected into the mold but not into the article-defining cavity. The gas charge is of predetermined quantity and pressure sufficient to assist in filling out the article-defining cavity with resin and promoting surface quality as described in greater detail in U.S. Pat. No. 4,948,547 entitled "Method for the Use of Gas Assistance in the Molding of Plastic Articles".

In step 1, a charge of fluid is pressurized or boosted to a predetermined pressure level.

In step 2, the charge of pressurized fluid is stored within a fluid receiver means or mechanism at a level within a predetermined range of pressures. This pressure may be reduced to the pressure required by the injection molding process.

In step 3, a quantity of molten plastic is injected from the nozzle of a conventional injection molding machine to a flow path into a mold cavity at an injection pressure. The quantity of molten plastic, i.e. the plastic shot, is less than the quantity of plastic which would ordinarily be required to fill the mold cavity if a hollow article is to be filled.

In step 4, the charge of pressurized fluid, preferably nitrogen gas, is communicated from the fluid receiver means during or after the plastic injection, to an orifice in communication with the mold cavity. Preferably, the orifice has a sufficiently small dimension to resist entry of the relatively viscous molten plastic.

In step 5, the pressurized gas is contained under pressure within the mold, until the article has set up in the mold cavity. During the formation of hollow plastic articles, the pressurized gas exerts outward pressure which forces the plastic to conform to the detail of the mold surface and exhibit fine detail with minimal sink marks or other surface defects.

In step 6, the gas is vented to ambient from the mold prior to opening the mold and removing the finished molded article.

In step 7, a decision must be made whether the injection molding process is to be continued.

In step 8, if the process is to continue, it is determined whether the pressure within the fluid receiver means is below the predetermined range. If it is, the process is continued at step 1 to begin pressurizing a second charge of gas. If the pressure within the fluid receiver means is still within the predetermined range, the process continues at step 3 wherein another quantity of molten plastic is injected from the nozzle into the injection aperture and into the mold cavity. At this point there is no need to pressure a second charge of gas since the pressure of the gas within the fluid receiver means is sufficient to mold another plastic article.

Description of the System

Figure 2:
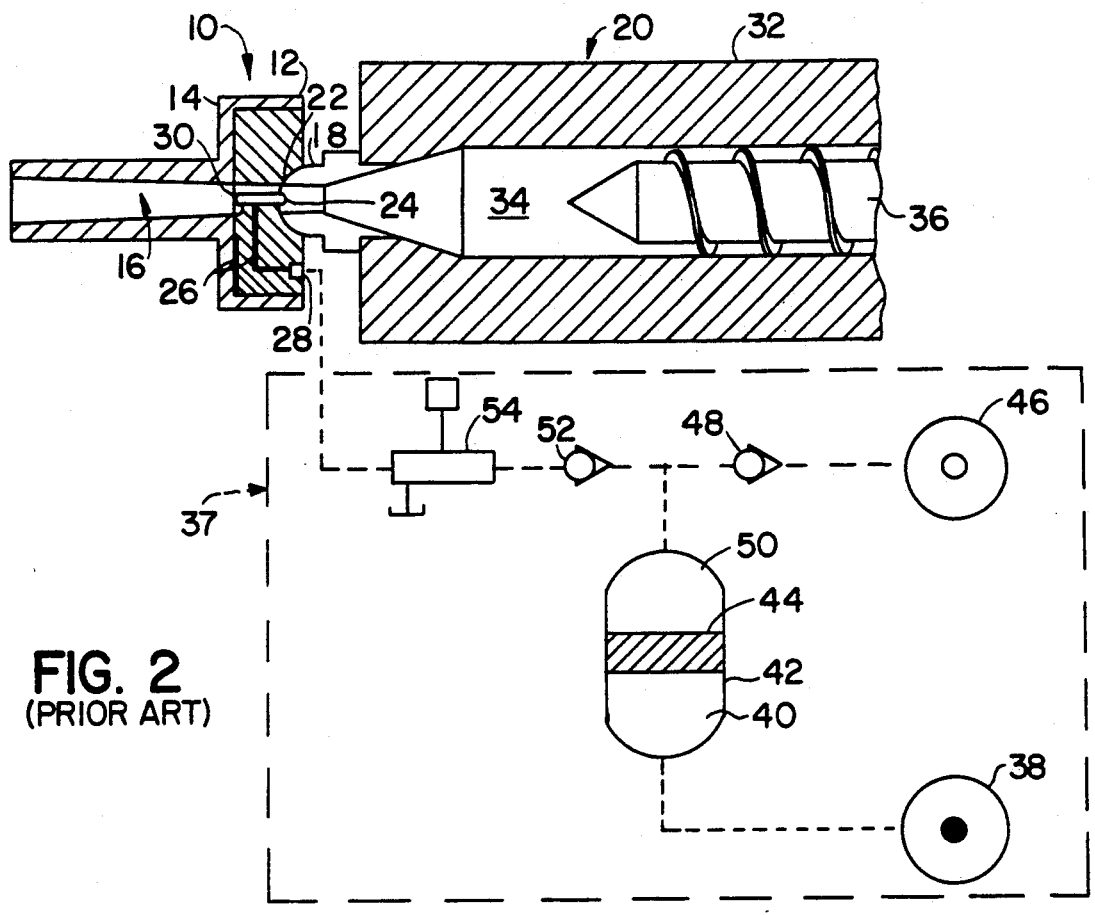
FIG. 2 is a general schematic view of a system constructed in accordance with the prior art.
Figure 3:
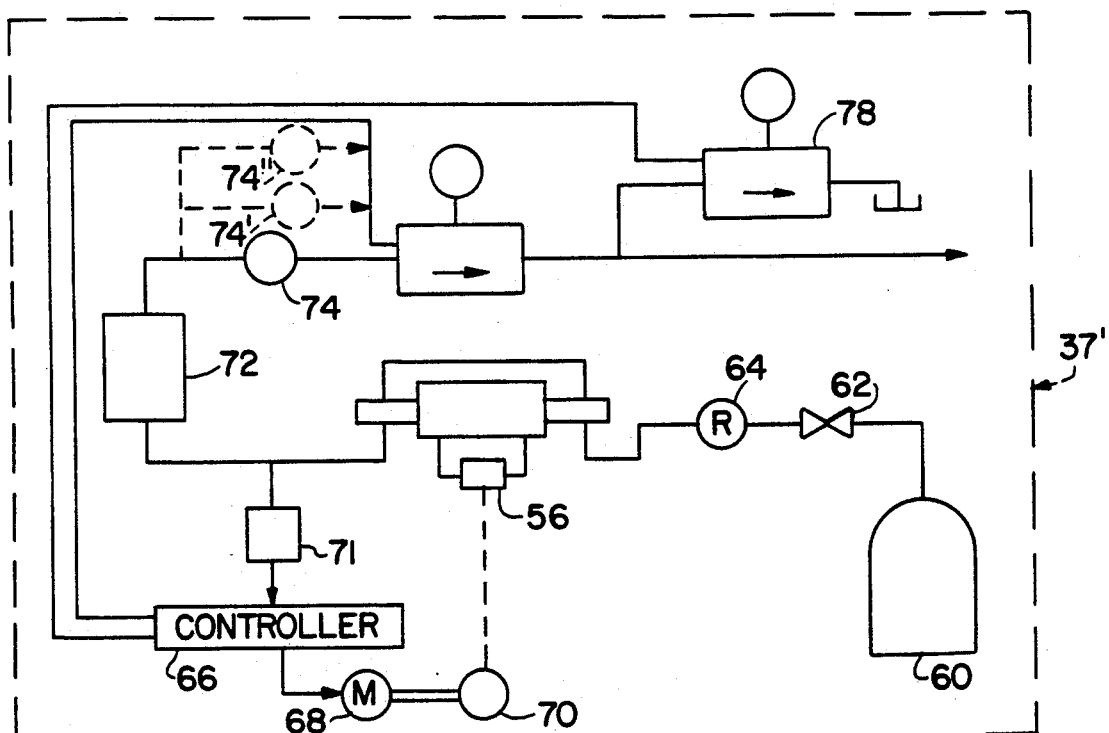
FIG. 3 is a general schematic view of a mechanism for charging and communicating pressurized fluid or gas to replace the mechanism illustrated in FIG. 2 to obtain the system of the present invention.

Referring now to FIG. 3, there is illustrated a mechanism 37' for charging and communicating pressurized fluid or gas to the sprue insert 12 and which replaces the mechanism 37 of FIG. 2.

A pneumatic air supply 56 directs a working fluid, such as air under pressure to a compartment (not shown) of a gas booster 58 effectively separated into first and second chambers. The first chamber receives the working gas and pressurizes the charge of fluid in the second chamber.

A gas supply 60 is provided for directing a charge of gas to a check valve 62 and regulated by a pressure regulator 64 into the second chamber of the gas booster 58 for pressurization.

The operation of the gas booster 58 is controlled by a controller 66 which controls the operation of a motor 68 to drive a pump 70 to provide pressurized gas to the air supply 56. In turn, the pressurized gas from the air supply 56 boosts the pressure of the fluid charge within the gas booster 58 to a predetermined pressure range set by a pressure switch 71 coupled to the controller 66. The pressurized gas is stored in a gas pressure receiver 72. Once the charge of fluid is pressurized to the pressure range setting of the pressure switch 71 by the booster 58, the booster 58 will stop under control of the controller 66.

The pressure of the gas from the pressure receiver 72 can be reduced to the proper pressure needed by the injection molding process by adjusting a pressure reducing valve 74. When the pressurized gas is needed for the injection molding process, a directional control valve 76 which had previously retained the gas within the gas receiver 72, is energized under control of the controller 66 and is open long enough to communicate the gas within the pressure gas receiver 72 through the passages 26 and 28 and insert 12 as shown in FIG. 2 to the injection orifice 30.

When a sufficient amount of gas has been communicated from the gas receiver 72, the directional control valve 76 is deenergized.

After the fluid has been contained under pressure to allow the article to set up in the mold cavity, the fluid is vented to ambient or to a reservoir by energizing a directional control valve 78 to open the valve 78, thereby venting the gas from the mold at a metered rate controlled by the valve 78. Thereafter, the directional control valve 78 is closed and the completed article is ejected from the mold.

Alternatively, the fluid may be vented to ambient by separating the mold and the injection nozzle 18 after the molten resin has cooled beneath its softening point.

The pneumatic mechanism 37' can be adapted to run more than one gas-assisted injection molding process and apparatus by adding a plurality of fluid pressure reducing valves 74' and 74" which, in turn, would be connected to their respective directional control valves in the same fashion as the pressure reducing valve 74 is connected to its respective directional control valves 76 and 78. The additional pressure reducing valves may have different pressure settings to accommodate fluids of differing pressures. Prior art hydraulic units are not as flexible and would be difficult to adapt to more than one injection molding machine or mold pair.

When the pressure in the gas receiver 72 drops below the low setting of the pressure switch 71, the booster 58 starts again recharging the gas receiver 72 until the setting of the pressure switch 71 is again reached.

The advantages accruing to the use of the pneumatic gas compression unit 37' are numerous. For example, the booster 58 can be in operation at any time during an injection molding process cycle. This is to be contrasted with the prior art hydraulic units wherein they are rechargeable only after the injection molding process is substantially through its cycle (i.e. 75%).

Also, the mechanism or unit 37' typically need not be recharged for several injection molding cycles. This is to be contrasted with a hydraulic unit, such as the unit 37, which must be recharged after each injection molding cycle.

Also, the mechanism or unit 37' is always available with a relatively constant pressure within a predetermined range of pressures wherein this is not necessarily so with a hydraulic unit (i.e. having a hydraulic multiplier system).

Also, a timer may be provided to time the relationship of plastic/gas injection to eliminate a "hesitation mark" in the plastic.

The invention has been described in an illustrative manner and, it is to be understood that, the terminology which has been used is intended to be in the nature of words of description rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. A method for the injection molding of plastic articles in an injection molding system including a resin injection nozzle and a mold having an injection aperture and a mold cavity for receiving molten resin from the nozzle, the method comprising the steps of:
    (a) pressurizing a charge of fluid;
    (b) storing the charge of pressurized fluid within a fluid receiver means at a pressure level within a predetermined range of pressures;
    (c) injecting a quantity of molten plastic from the injection nozzle through the injection aperture and into the mold cavity;
    (d) communicating the pressurized fluid from the fluid receiver means to an orifice in communication with the mold cavity simultaneously with or after the step of injecting;
    (e) containing the fluid under pressure within the mold until the article is set up in the mold cavity thereby completing the formation of the plastic article;
    (f) venting the fluid from the mold;
    (g) repeating steps (c) through (f) until the pressure within the fluid receiver means falls below the range of pressures; and
    (h) repeating steps (a) and (b) as soon as the pressure within the fluid receiver falls below the range of pressures in preparation for molding another article wherein the method further comprises the step of reducing the pressure of the fluid from the fluid receiver means to an acceptable level for molding the articles during step (d).

2. The method of claim 1 wherein the fluid is a gas.

3. The method of claim 1 wherein the mold includes a sprue, the sprue having the injection aperture and wherein the charge of pressurized fluid is introduced to the mold cavity from the sprue.

4. The method of claim 1 wherein the step of venting includes the step of separating the mold and the injection nozzle after the molten resin has cooled beneath its softening point.

5. The method of claims 1 or 4 wherein the fluid is vented from the article through the same orifice as which it was introduced.

* * * * *